United States Patent

Abe et al.

[11] Patent Number: 5,250,969
[45] Date of Patent: Oct. 5, 1993

[54] DUSTPROOF VIEW FINDER

[75] Inventors: Tetsuya Abe, Hokkaido; Katsuhiko Nozaki, Tokyo, both of Japan

[73] Assignee: Asahi Kogaku Kogyo Kabushiki Kaisha, Tokyo, Japan

[21] Appl. No.: 795,179

[22] Filed: Nov. 19, 1991

[30] Foreign Application Priority Data

Nov. 26, 1990 [JP] Japan .............. 2-123879[U]

[51] Int. Cl.⁵ ............................................. G03B 13/02
[52] U.S. Cl. ............................................. 354/219
[58] Field of Search ................................. 354/219

[56] References Cited

U.S. PATENT DOCUMENTS

| | | | |
|---|---|---|---|
| 3,915,552 | 10/1975 | Rickert | 350/67 |
| 4,119,985 | 10/1978 | Ando et al. | 354/223 |
| 4,209,247 | 6/1980 | Urano et al. | 354/219 |
| 4,294,529 | 10/1981 | Sato et al. | 354/53 |
| 4,381,892 | 5/1983 | Someya | 354/287 |
| 4,452,522 | 6/1984 | Murakami et al. | 354/289.12 |
| 4,705,374 | 11/1987 | Robings | 354/225 |
| 4,969,723 | 11/1990 | Kato et al. | 350/501 |

FOREIGN PATENT DOCUMENTS

| | | |
|---|---|---|
| 1844211 | 12/1961 | Fed. Rep. of Germany . |
| 3213457 | 10/1983 | Fed. Rep. of Germany . |
| 3624821 | 2/1988 | Fed. Rep. of Germany . |
| 489125 | 7/1938 | United Kingdom . |
| 784014 | 10/1957 | United Kingdom . |
| 924757 | 5/1963 | United Kingdom . |
| 1035990 | 7/1966 | United Kingdom . |
| 1052168 | 12/1966 | United Kingdom . |
| 1341140 | 12/1973 | United Kingdom . |

*Primary Examiner*—Michael L. Gellner
*Assistant Examiner*—Nicholas J. Tuccillo
*Attorney, Agent, or Firm*—Sandler, Greenblum & Bernstein

[57] ABSTRACT

A dustproof view finder in which an image formed by an objective optical system is made erect by an image erecting optical system and is observed through an ocular optical system as an erect image, the optical system including a pair of front and rear optical elements spaced from one another at a predetermined distance to define an aerial space therebetween, and a seal member which encloses the aerial space.

16 Claims, 3 Drawing Sheets

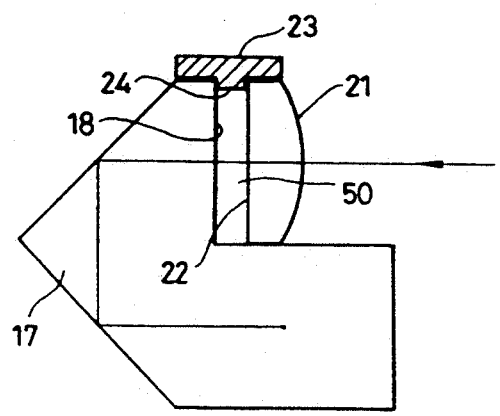
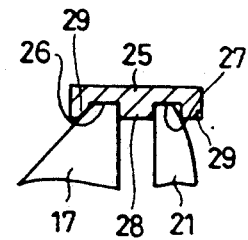
Fig. 1
Fig. 2
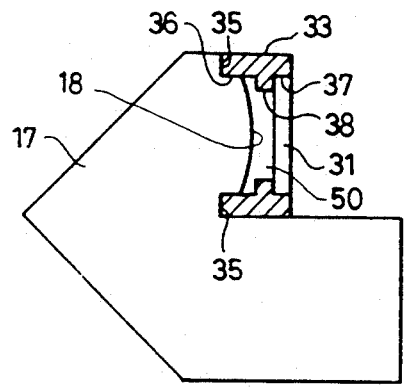
Fig. 3
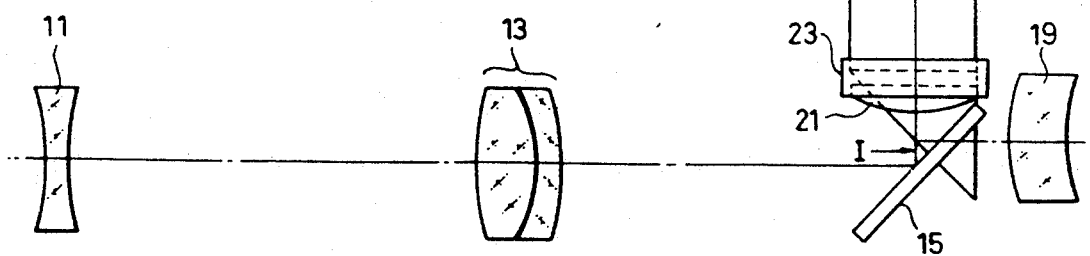
Fig. 4

DUSTPROOF VIEW FINDER

BACKGROUND OF THE INVENTION

1. Field of the Invention

The present invention relates to a dustproof view finder, for example, in a lens shutter type of camera.

2. Description of Related Art

In a known lens shutter type of camera, an inverted Galilean finder or a real image type finder is used as a view finder. For instance, a known real image type view finder is comprised of a first lens group 41, a second lens group 43, a rectangular prism 45, an image erecting prism 47, and an eyepiece 49, arranged in this order from the object side, as shown in FIG. 6. The real image type view finder also includes a field plate 51 located in an aerial space defined between an emission surface of the rectangular prism 45 and an incident surface of the image erecting prism 47. The view finder is supported for example by a camera body. The field plate 51 is made of a thin transparent plate with a field frame 53 evaporated on its rear surface, as shown in FIG. 7.

The field frame 53 is immovably held by a field plate holder 56 at a predetermined position, as shown in FIG. 8. The field frame 53 and the field plate holder 56 are usually exposed to the atmosphere.

Accordingly, dust or foreign matter 52 may adhere to the field plate 51 (FIGS. 7 and 8). As is well known, the field plate 51 is located in the vicinity of an image plane formed by the first lens group 41 and the second lens group 43. Therefore, if dust (or foreign matter) 52 adheres to the field plate 51, the field of view of the finder, and accordingly the image of an object to be taken, will be obstructed.

The same is true when the field frame 55 is provided on the incident surface of the image erecting prism 47 or the vicinity thereof (FIG. 9).

SUMMARY OF THE INVENTION

The primary object of the present invention is to provide a view finder in which no dust (or foreign matter) appears in the field of view.

To achieve the object mentioned above, according to the present invention, there is provided a dustproof view finder in which an image formed by an objective optical system, is erected by an image erecting optical system and is observed by an ocular optical system as an erect image. The dustproof view finder comprises a pair of front and rear optical elements spaced from one another at a predetermined distance to define an aerial space therebetween, and an enclosing device which encloses the aerial space.

Preferably, the dustproof view finder further comprises a field frame which is enclosed in the aerial space between the optical elements. One of the optical elements can be made of a field plate which is provided thereon with the field frame.

The present disclosure relates to subject matter contained in Japanese Utility Model Application No. 02-123879 (filed on Nov. 26, 1990) which is expressly incorporated herein by reference in its entirety.

BRIEF DESCRIPTION OF THE DRAWINGS

The invention will be described below in detail with reference to the accompanying drawings, in which;

FIG. 1 is an enlarged sectional view of a main part of a view finder according to a first embodiment of the present invention, taken along the line I—I in FIG. 4;

FIG. 2 is an enlarged sectional view of a main part of a view finder according to a second embodiment of the present invention;

FIG. 3 is an enlarged sectional view of a main part of a view finder according to a third embodiment of the present invention;

FIG. 4 is an explanatory view of a real image type of view finder to which the present invention is applied;

DESCRIPTION OF THE PREFERRED EMBODIMENTS

Figure 5:
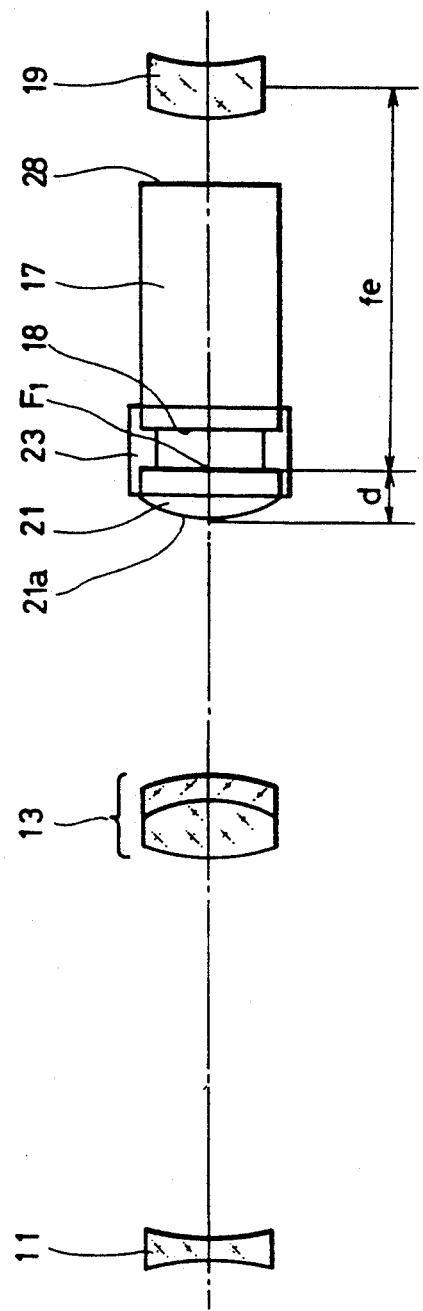
FIG. 5 is a schematic view showing an arrangement of optical elements along an optical path, shown in FIG. 4.
Figure 6:
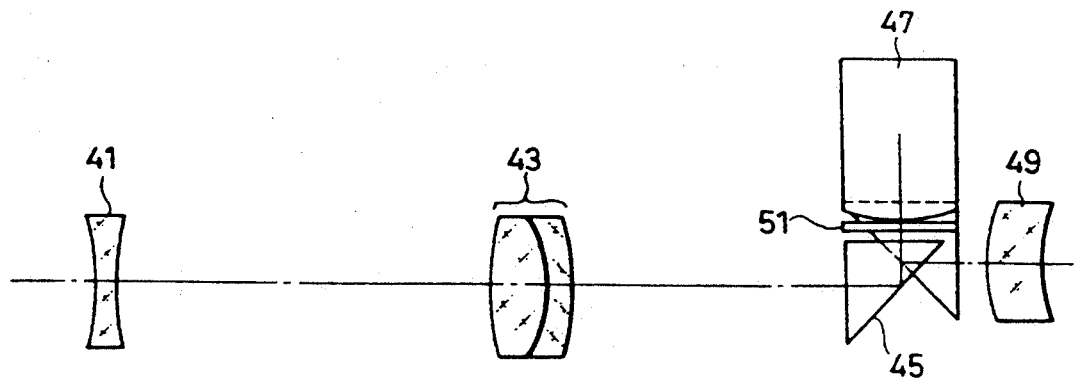
FIG. 6 is an explanatory view of a known real image type of view finder.
Figure 7:
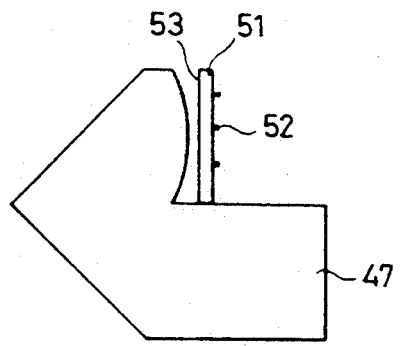
FIGS. 7, 8, and 9 are sectional views of a field frame and its surroundings in a known real image type of view finder as shown in FIG. 6, respectively.
Figure 8:
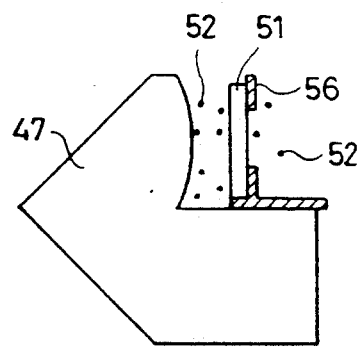
Figure 9:
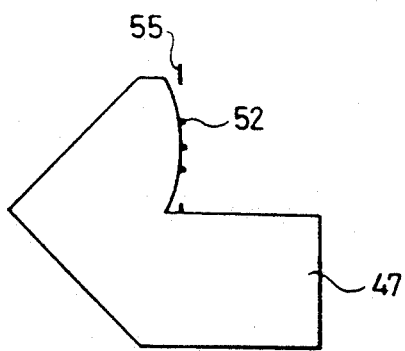

FIG. 4 shows a real image type of view finder to which the present invention is applied.

The real image type of view finder includes first and second lens groups 11 and 13 which form an objective optical system, a mirror 15 and an image erecting prism 17 which form an image erecting optical system, and an eyepiece 19 which forms an ocular optical system. These optical elements are arranged in this order from the objective side. The view finder also includes a third lens group (field lens) 21 between the mirror 15 and the image erecting prism 17. The third lens group 21 is provided on its rear surface with a field frame 22 (FIG. 1). Alternatively, it is possible to provide the field frame 22 on the incident surface of the image erecting prism 17.

A closure or seal member 23 is mounted to the outer peripheries of the third lens group 21 and the image erecting prism 17, enclosing an aerial space 50 defined by and between the third lens group 21 and the incident surface 18 of the image erecting prism 17. The seal member 23 is made of a flexible or elastically deformable material, such as sponge, rubber, or synthetic resin, etc., having good light interception and dust-proof properties.

As can be understood from the foregoing, according to the present invention, since the aerial space 50, defined between the field frame 22 and the incident surface 18 of the image erecting prism 17, is enclosed by the seal member 23, foreign matter (dust etc.) is prevented from entering the aerial space 50. Namely, since foreign matter does not come into contact with frame 22, nor anything within the aerial space 50, the field of view is not obstructed. Thus, an object image and the field frame 22 is maintained clearly visable to a photographer.

Preferably, the seal member 23 has a projection 24 which is snugly fit into the aerial space 50 to enhance the seal effect, as shown in FIG. 1.

It is possible to make the seal member 23 of an adhesive material, or coat the seal member 23 with an adhesive material, so that dust or other foreign matter is even more effectively prevented from coming into contact with the field frame 22.

Alternatively, it is possible to make the seal member 23 of an adhesive tape. In this alternative, the seal member 23 (i.e., adhesive tape) can be easily adhered to the peripheral surfaces of the image erecting prism 17 and the third lens group 21, again, preventing dust or other foreign matter from interfering with the field frame 22, and obstructing the photographer's view.

FIG. 2 shows a modified seal member 25 which is provided on its opposite ends with projections 29 in addition to the central projection 28, so that recesses 26 and 27 are formed between the end projections 29 and the central projection 28. The image erecting prism 17 and the third lens group 21 are fit into the recesses 26 and 27 respectively. The seal member 25 not only closes the aerial space 50, but also stably holds the third lens group 21 with respect to the image erecting prism 17 in a predetermined positional relationship.

Although the field frame 22 is formed on the rear surface of the third lens group 21 in the above mentioned embodiments, it is possible to form the field frame on the field plate 31 by evaporation or a similar means. In this case, the field plate 31 is provided between the third lens group 21 and the incident surface 18 of the image erecting prism 17, as shown in FIG. 3. The incident surface 18 of the image erecting prism 17 is provided on its peripheral edge with an annular stepped portion 35, in which a first mounting portion 36 of an annular seal member 33, formed at one open end thereof, is fitted. On the other open end of the annular seal member 33 is formed an annular second mounting portion 37 in which the field plate 31 is fitted. The seal member 33 has a central annular projection 38 against which the field plate 31 abuts to restrict the fitting position of the field plate 31 in the second mounting portion 37 of the seal member 33.

The seal member 33, shown in FIG. 3, not only closes the aerial space 50 between the field plate 31 and the image erecting prism 17, but also firmly holds the field plate 31.

If the following relationship between the focal length "fe" of the ocular optical system (eyepiece 19) and the optical path length "d", which is defined as the distance from the image forming position F1 at which an object image is formed by the objective optical system (first and second lens groups 11 and 13) to the incident surface 21a of the third lens group 21, occurs, an image of the exposed dust or foreign matter in the vicinity of the image forming position F1 is dimmed, as shown in FIG. 5:

$$|(1000 \times d)/ \{n \times (fe)^2\}| \geq 2.0$$

In the above, "n" is the refractive index of the space defined between the image forming position F1 and the front surface 21a of the third lens group 21. Also, the unit of measurement for "d" and "fe" is millimeter (mm). As a rule, F1 is constituted on the rear surface of the third lens group 21, and the front focal point of the eyepiece 19 constituted so as to be almost identical with the image forming position F1.

Even if dust or foreign matter adhere to the front surface 21a of the third lens group 21, the dust or foreign matter may not be conspicuous when the absolute value of diopter of the eyepiece optical system to the front surface of the third lens is more than 2.

The present invention is not limited to the illustrated embodiments. The basic concept of the present invention is to enclose or seal in the aerial space in the vicinity of the image forming position, to isolate it from the atmosphere.

As can be understood from the foregoing, according to the present invention, since the optical path in the image erecting optical system, between the field lens and the prism thereof, is enclosed or isolated by the seal member, dust or foreign matter does not enter the optical path. Furthermore, since the peripheral portion of the field frame is covered by the seal member to prevent dust or foreign matter from being stuck to the surface thereof, the field of view is not obstructed.

We claim:

1. A dustproof view finder in which an image formed by an objective optical system is erected by an image erecting optical system and is observed by an ocular optical system as an erect image, said dustproof view finder comprising a pair of front and rear optical elements spaced from one another at a predetermined distance to define an aerial space therebetween, and an enclosing device which encloses the aerial space, the enclosed aerial space defining therein an image forming position at which an object image is formed by the objective optical system;

wherein the following relationship exists between focal length "fe" of the ocular optical system, optical path length "d" from the image forming position to a front surface of the front optical element, and refractive index "n" of the front optical element:

$$|(1000 \times d)/ \{n \times (fe)^2\}| \geq 2.0$$

2. A dustproof view finder according to claim 1, further comprising a field frame provided on a surface of one of the optical elements located in the closed aerial space.

3. A dustproof view finder according to claim 1, wherein said enclosing device comprises a seal member which is mounted to the optical elements to enclose the aerial space.

4. A dustproof view finder according to claim 3, wherein said seal member is provided with a fitting portion in which the optical elements are fitted.

5. A dustproof view finder according to claim 4, wherein said seal member has an adhesive surface.

6. A dustproof view finder according to claim 5, wherein said seal member is made of an adhesive material.

7. A dustproof view finder according to claim 5, wherein said seal member is made of an adhesive tape.

8. A dustproof view finder including a pair of optical elements spaced from one another, said dustproof view finder comprising a field frame provided between the optical elements, and a seal member which seals said field frame in an serial space therebetween, and an enclosing device which encloses said field frame in a space defined between the optical elements;

wherein the following relationship exists between focal length "fe" of the ocular opitcal system, optical path length "d" from the space between the optical elements to a front surface of the front optical element, and refractive index "n" of the front optical element:

$$|(1000 \times d)/ \{n \times (fe)^2\}| \geq 2.0.$$

9. A dustproof view finder according to claim 8, wherein one of the optical elements is a field plate which is provided thereon with said field frame.

10. A dustproof view finder according to claim 9, wherein said seal member surrounds the other optical element and said field plate.

11. A dustproof view finder according to claim 10, wherein said seal member has an adhesive surface.

12. A dustproof view finder according to claim 11, wherein said seal member is made of an adhesive material.

13. A dustproof view finder according to claim 8, wherein said seal member is made of an adhesive tape.

14. A dustproof view finder according to claim 10, wherein said seal member is provided with mounting portions to which the other optical element and said field plate are mounted.

15. A dustproof view finder according to claim 8, wherein the space defined between the optical elements defines therein an image forming position at which an object image is formed by the objective optical system.

16. A dustproof view finder according to claim 8, further comprising a field frame provided on a surface of one of the optical elements located in the closed aerial space.

* * * * *